(12) United States Patent
Iwashita et al.

(10) Patent No.: US 7,237,512 B2
(45) Date of Patent: Jul. 3, 2007

(54) CONTROLLER COOLING STRUCTURE IN ELECTRIC VEHICLE

(75) Inventors: Kanau Iwashita, Saitama (JP); Shinji Takayanagi, Saitama (JP); Hiroyuki Kikuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 13 days.

(21) Appl. No.: 11/202,093

(22) Filed: Aug. 12, 2005

(65) Prior Publication Data
US 2006/0038522 A1 Feb. 23, 2006

(30) Foreign Application Priority Data
Aug. 20, 2004 (JP) .............................. 2004-240699

(51) Int. Cl.
*F01P 7/14* (2006.01)
(52) U.S. Cl. .................. 123/41.1; 318/592; 310/64
(58) Field of Classification Search ............... 123/41.1, 123/41.44; 180/65.3, 220; 318/592; 310/64
See application file for complete search history.

(56) References Cited

U.S. PATENT DOCUMENTS
6,722,460 B2 * 4/2004 Yang et al. .................. 180/220

FOREIGN PATENT DOCUMENTS

| EP | 1 137 154 A1 | 9/2001 |
|----|--------------|--------|
| EP | 1 137 154 A9 | 9/2001 |
| EP | 1 251 022 A1 | 10/2002 |
| FR | 2 829 434 A | 3/2003 |
| JP | 5-95606 A | 4/1993 |
| JP | 10-285800 A | 10/1998 |
| JP | 2003-163476 A | 6/2003 |
| WO | WO-02/35899 A1 | 5/2002 |
| WO | WO-03/063564 A1 | 7/2003 |

OTHER PUBLICATIONS

Carricchi et al., IEEE Industry Applications Magazine, vol. 2, No. 6, (Nov. 1996).

* cited by examiner

*Primary Examiner*—Stephen K. Cronin
*Assistant Examiner*—Hyder Ali
(74) *Attorney, Agent, or Firm*—Birch, Stewart, Kolasch & Birch, LLP

(57) ABSTRACT

To provide a cooling structure which can effectively cool a controller for controlling a drive of a motor in an electric vehicle. A controller cooling structure of an electric vehicle is provided with a motor for supplying power to the rear wheel as the drive wheel, a motor driver for controlling a drive of the motor and a cooling plate for circulating the cooling water into the internal side of the motor driver in order to cool the same. In this controller cooling structure, one surface of the cooling plate is arranged adjacent to the motor driver and the other surface of the same is arranged adjacent to the rear swing arm.

23 Claims, 7 Drawing Sheets

CONTROLLER COOLING STRUCTURE IN ELECTRIC VEHICLE

CROSS-REFERENCE TO RELATED APPLICATIONS

This nonprovisional application claims priority under 35 U.S.C. § 119(a) on Patent Application No. 2004-240699, filed in Japan on Aug. 20, 2004, the entirety of which is incorporated herein by reference.

BACKGROUND OF THE INVENTION

1. Field of the Invention

The present relates to a cooling structure for cooling a controller, the controller controlling the drive of a driving motor in an electric vehicle.

2. Description of Background Art

An electric vehicle provided with a driving motor has employed a water cooling system as a cooling structure for a controller for controlling the drive of the motor (for example, refer to JP-A No. 285800/1998).

SUMMARY OF THE INVENTION

An electric vehicle that is provided with a fuel cell as the vehicle power source (fuel cell vehicle) generally requires heavier substances such as the fuel cell to be mounted thereto, for example, a hydrogen cylinder, and a secondary cell. When a motor is designed to provide higher output, the weight of the fuel cell increases. In addition, the controller is increased in capacity to generate a larger amount of heat. Accordingly, it is desirable that the cooling structure described above have a structure that enhances the cooling effect of the controller.

Accordingly, the present invention is intended to provide a cooling structure which can effectively cool the controller to control the drive of the motor in an electric vehicle provided with a motor to drive the vehicle.

As a means for solving the problems described above, a first aspect of the present invention proposes a controller cooling structure in an electric vehicle comprising a motor (for example, a motor 31 of an embodiment) for supply electric power to a drive wheel (for example, rear wheel 32 in the embodiment), a controller (for example, a motor driver 64 in the embodiment) for controlling a drive of the motor, and a cooling plate (for example, a cooling plate 65 in the embodiment) for circulating the cooling water into the interior to cool the controller, wherein the cooling plate is arranged, in one surface, adjacent to the controller and, in the other surface, adjacent to a vehicle body forming member (for example, a rear swing arm 21 in the embodiment).

According to this constitution, for example, heat generated by the controller including a power FET or the like is effectively absorbed by a cooling plate of the water cooling system. Heat absorbed by the cooling plate itself is effectively propagated, for example, to the vehicle body forming member made of aluminum.

A second aspect of present invention provides a motor unit (for example, a motor unit 20 in the embodiment) which accommodates the motor and is supported to freely swing to a vehicle body frame (for example, a vehicle body frame 4 in the embodiment) together with the vehicle body forming member. The cooling plate and the controller are mounted in the motor unit.

According to this construction, the connecting distance between the motor and controller becomes short and thereby an amount of heat generated by the controller is also suppressed. Moreover, the electrical influence between the motor and controller is also controlled.

A third aspect of the present invention also includes a controller arranged adjacent to the motor. The controller does not overlap the motor when it is viewed from the side surface of the vehicle body.

According to this construction, a connecting distance between the motor and controller becomes shorter and an influence of heat generated from the motor on the controller can further be minimized.

A fourth aspect of the present invention also includes a portion adjacent to the cooling plate in the vehicle body forming member that is formed flat.

According to this construction, heat generated from the controller is effectively propagated, via the cooling plate, to the portion formed flat in the vehicle body forming member.

A fourth aspect of the present invention also includes the water supply pipe and water discharge pipe connected to the cooling plate (for example, water supply pipe 65a, water discharge pipe 65b in the embodiment). The water discharge pipe and the cooling plate are arranged adjacent to the vehicle body forming member.

According to this construction, the water supply pipe and water discharge pipe do not project to the external side of the motor unit.

According to the first aspect of the present invention, the cooling effect of the controller can further be enhanced.

According to the second aspect of the present invention, the wire between the motor and controller can be simplified and the cooling effect can relatively be enhanced by suppressing an amount of heat generated from the controller. Moreover, an electrical influence between the motor and controller can further be reduced.

According to the third aspect of the present invention, a connecting distance can further be shortened and the cooling effect of the controller can further be enhanced by suppressing the influence of heat generated by the motor.

According to the fourth aspect of the present invention, the cooling effect of the controller can be enhanced because the heat generated from the controller is effectively propagated to the vehicle body forming member.

According to the fifth aspect of the present invention, the pipe for cooling water in the periphery of the motor unit can be simplified and thereby maintenance of the cooling system can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The preferred embodiment of the present invention will be described below with reference to the accompanying drawings. The right and left directions and front and rear directions in the following description should be identical, unless otherwise described particularly, to the direction in the vehicle. Moreover, the arrow mark FR indicates the front side of the vehicle, while the arrow mark LH indicates the left side of the vehicle. Furthermore, the arrow mark UP indicates the upper side of the vehicle, respectively.

Figure 1:
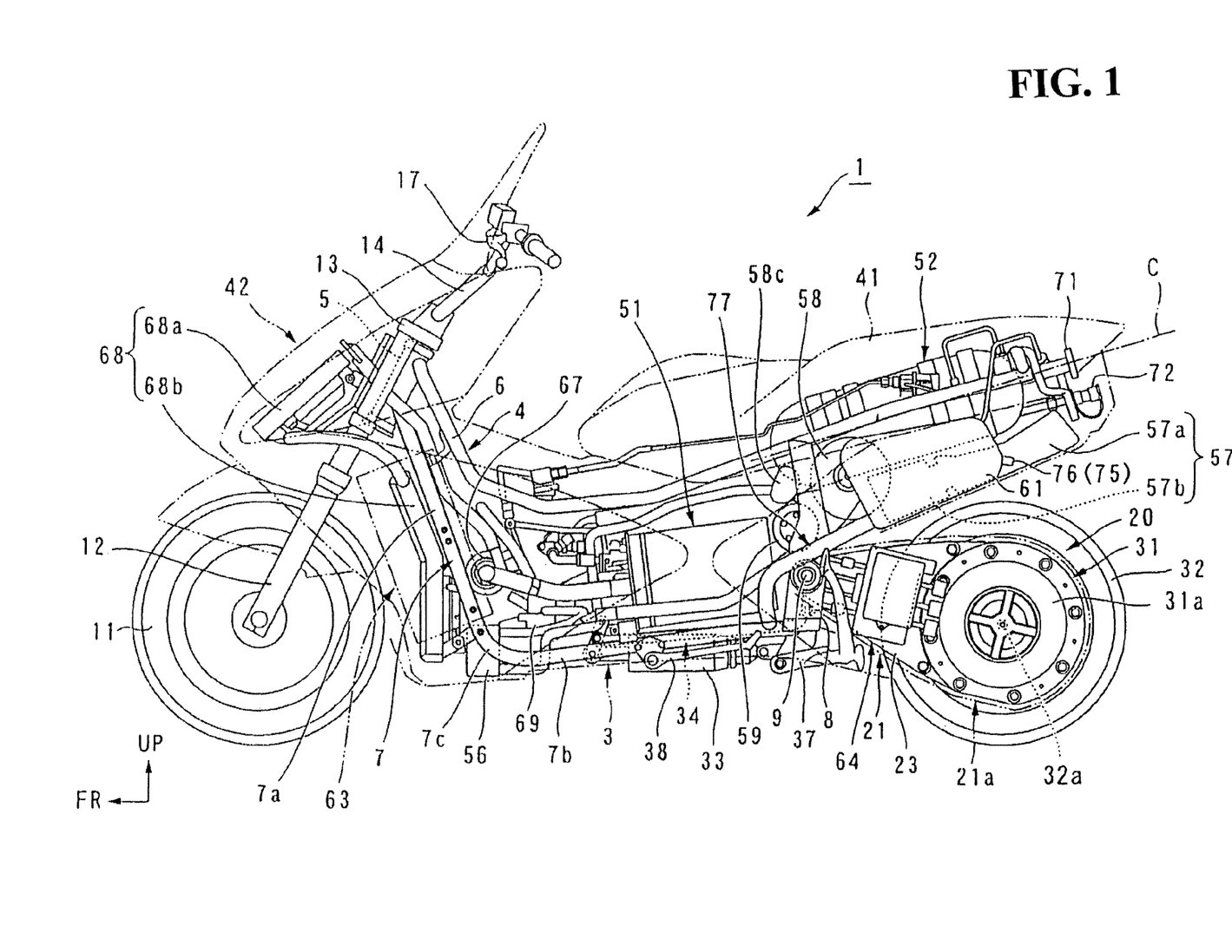
FIG. 1 is a side elevation of an electric vehicle (motorcycle) in an embodiment of the present invention.
Figure 2:
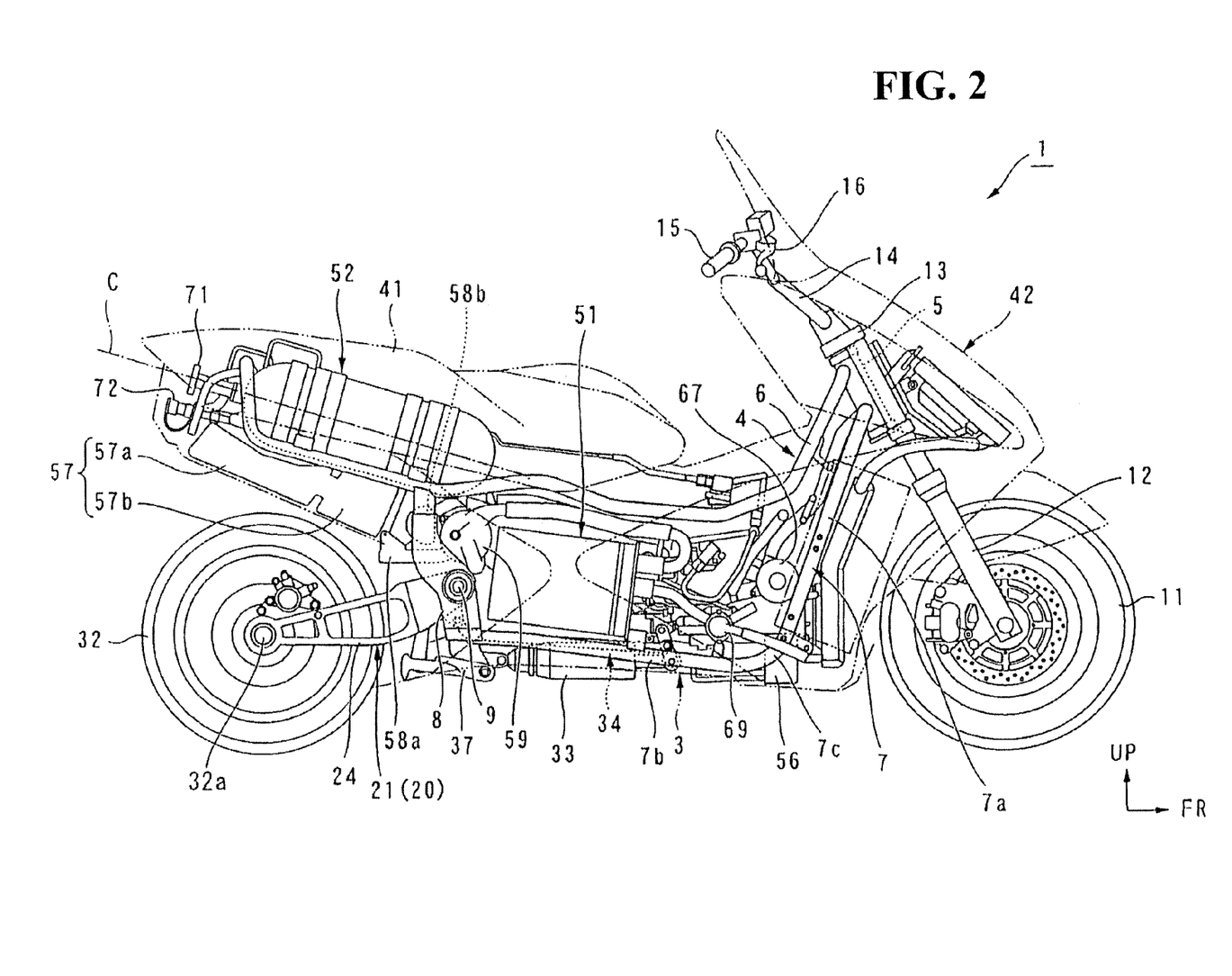
FIG. 2 is a right side elevation of the electric vehicle.
Figure 3:
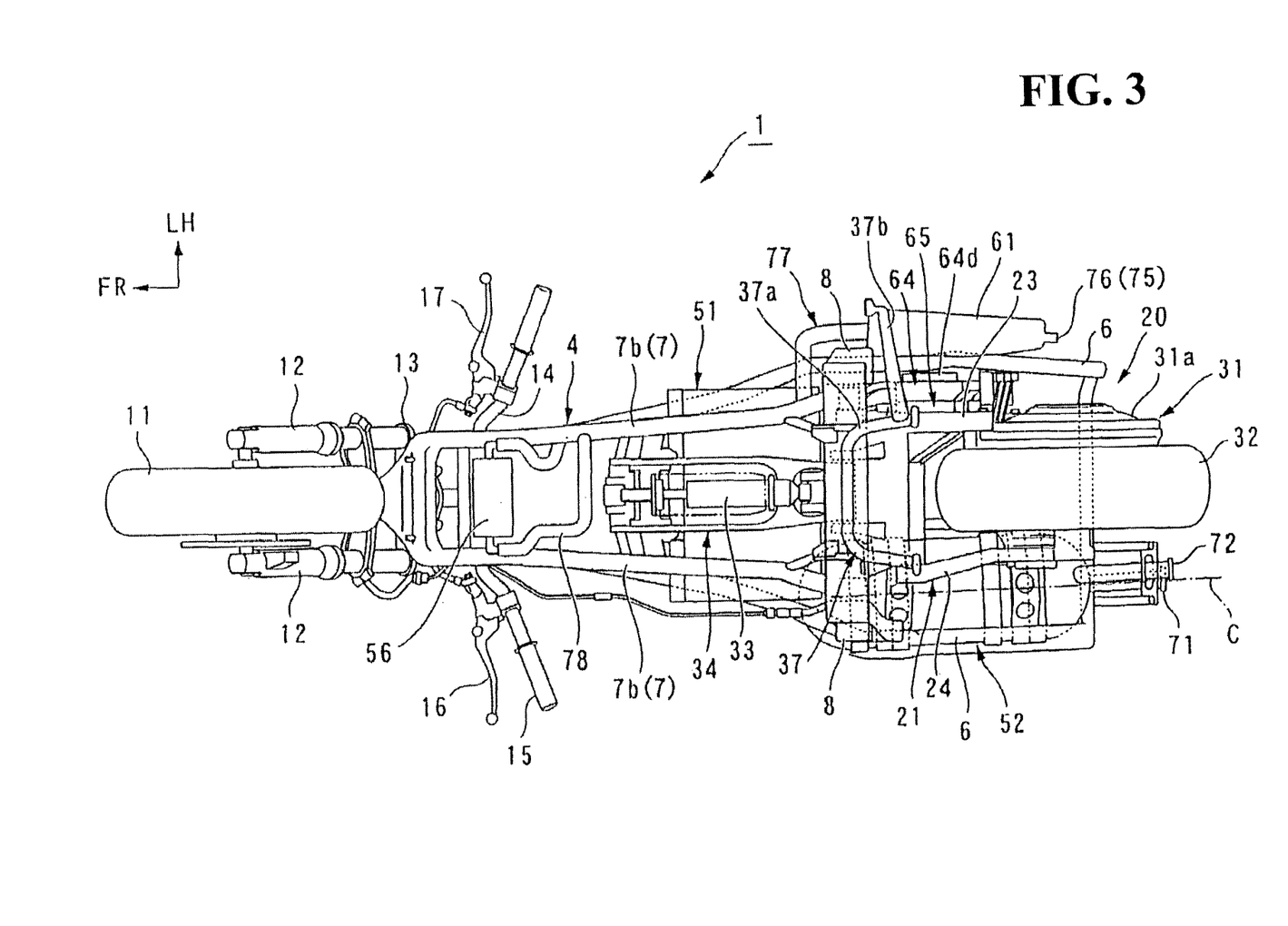
FIG. 3 is a lower surface diagram of the electric vehicle.

A motorcycle 1 illustrated in FIGS. 1–3 is formed as a fuel cell vehicle (electric vehicle) which can continue running by driving a vehicle driving motor 31 on the basis of electric power supplied from a fuel cell 51. The fuel cell 51 is mounted to almost the center of the vehicle body. Moreover, the motorcycle 1 is also a scooter type vehicle including a lower floor part (hereinafter, referred to as only a floor part) 3. However, it should be understood that the present invention can be applied to other two, three and four wheel vehicles as well. In the vicinity of the floor part 3, a rectangular-parallelepipedic fuel cell 51 is arranged and a motor 31 as a so-called wheel-in motor is arranged within the wheel of the rear wheel 32 as the drive wheel of the motorcycle 1. The motor 31 is formed as an integrated unit by including, in the casing 31a, a motor body and a reduction mechanism. The output shaft thereof is mounted into the wheel, for example, from the left side under the condition that it is arranged coaxially with the axle 32a of the rear wheel.

A front wheel 11 of the motorcycle 1 is pivotally supported at a lower end part of a pair of right and left front forks 12. Upper portions of the front forks 12 are pivotally supported to a head pipe 5 of the front end part of the vehicle body frame 4 via a steering stem 13 in order to steer the vehicle. A handle 14 is mounted to the upper end part of the steering stem 13. A throttle grip 15 is arranged to the right grip of the handle 14. Front brake levers 16, 17 are respectively arranged on the front side of the right and left grips.

A pivot plate 8 is provided at a rear part of the vehicle body frame 4. The pivot plate 8 extends in the upper and lower directions of the vehicle body. A front end part of a rear swing arm (vehicle body forming member) 21 is pivotally supported at a part or the pivot plate 8 that is a little lower than the intermediate part of the pivot plate 8. The rear swing arm 21 is pivotally supported via a pivot shaft 9 to swing a rear end part thereof in the upper and lower directions of the vehicle body. The rear swing arm 21 supports a casing 31a of the motor 31 with a left arm body 23 thereof that extends up to the front end part of the motor 31. Meanwhile, a right arm body 24 extends up to the center position of the rear wheel 32 to pivotally support the axle 32a of the rear wheel. The motor unit 20, as a swing unit of the motorcycle 1, is constituted mainly of such rear swing arm 21 and motor 31.

A rear cushion 33 is arranged at the lower part of the fuel cell 51 located in the lower part of the vehicle body frame 4. The rear cushion 33 extends in the front and rear directions of the vehicle body. The rear end part of the rear cushion 33 is coupled to the lower part of the vehicle body frame 4 and the front end part of the rear cushion 33 is coupled to the lower part of the motor unit 20 (rear swing arm 21) via a link mechanism 34. The link mechanism 34 strokes the rear cushion 33 in the front and rear directions with upper and lower swinging of the motor unit 20. With such stroke of the rear cushion 33, shock and vibration applied to the motor unit 20 can be absorbed.

The vehicle body frame 4 includes an upper tube 6, which extends diagonally toward a rear lower direction, branches to the right and left sides from the upper side of the head pipe 5. The upper tube 6 is then bent in height to an almost intermediate height in the upper and lower directions on the vehicle body. Thereafter, the upper tube 6 extends toward the rear part. A lower tube 7, which extends diagonally toward a rear lower direction, branches to the right and left sides from the lower side of the head pipe 5. The lower tube 7 is then bent at a lower end part of the vehicle body and thereafter extends toward the rear part. The rear end portions of each upper tube 6 and each down tube 7 are respectively coupled with the upper end and lower end portions of the pivot plate 8. Hereinafter, the portion of the down tube that extends up to the bending part 7c in the lower end part of the vehicle body from the head pipe 5 is defined as the front side part 7a. The portion of the down tube 7 that extends up to the pivot plate 8 from the bending part 7c is defined as the lower side part 7b.

Each upper tube 6 extends toward the rear side from the pivot plate 8 up to the rear end part of the vehicle body. The latter half part of the upper tube 6 is used as a seat frame to support a seat 41 of a rider.

The motorcycle 1 is covered, at its body, with a vehicle body cover 42 formed of a synthetic resin. This vehicle body cover 42 also functions as a windshield and a part thereof forms a floor part 3 together with the vehicle body frame 4. At the lower center of the vehicle body frame 4, a main kick stand 37 is mounted to support the vehicle body in a generally straight, self-standing condition. A side kick stand 38 is mounted at the lower left side of the vehicle body frame 4 to support the vehicle in a self-standing condition with a certain inclination to the left side.

Figure 4:
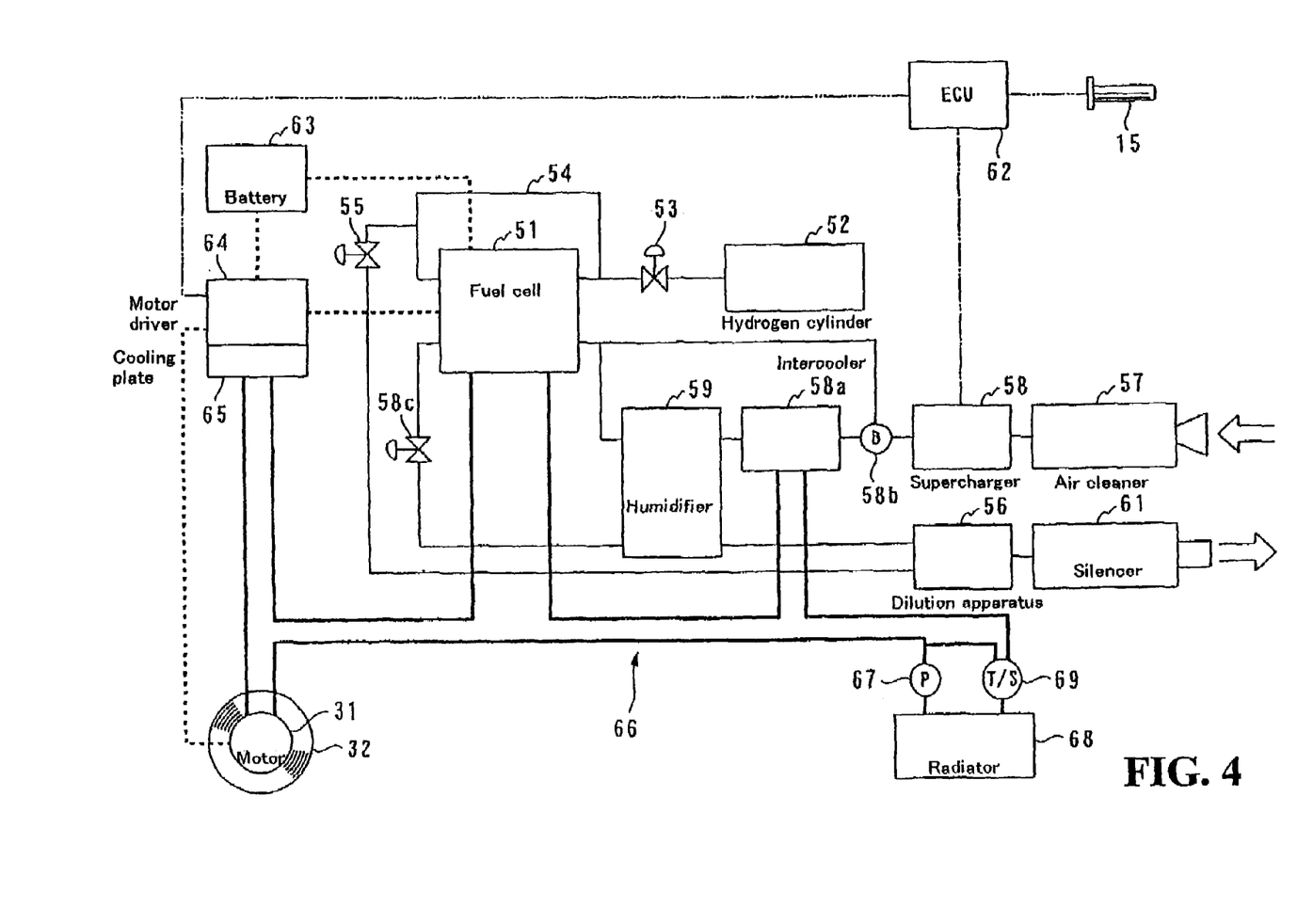
FIG. 4 is a structural diagram of the principal portion of a fuel cell system in the electric vehicle.

A summary of the fuel cell system of the motorcycle 1 will now be described with reference to FIG. 4. The fuel cell 51 is a well known solid-state polymer film type fuel cell (PEMFC) formed by laminating many layers of a unit cell. Hydrogen gas is supplied as the fuel to the anode side of the fuel cell. The air including oxygen as the oxidation agent (gas) is supplied to the cathode side. Thereby, electric power can be generated and water is also produced through an electrochemical reaction.

The hydrogen gas as the fuel is supplied to the fuel cell 51 in a predetermined pressure via a shielding valve 53 from a hydrogen cylinder 52. The hydrogen gas is then guided, after use for power generation, into a hydrogen circulation route 54. In this hydrogen circulation route 54, the hydrogen gas not used for reaction is then supplied repeatedly to the fuel cell 51 together with the fresh hydrogen gas from the hydrogen cylinder 52. The hydrogen gas circulating within the hydrogen circulation route 54 can be guided into a dilution apparatus 56 via a purge valve 55.

Meanwhile, the air as the oxidation agent is guided to a supercharger 58 via an air cleaner 57. The air is then supplied to the fuel cell 51 under a condition where it is pressurized to a predetermined pressure. The air is then guided, after use for power generation, to the dilution apparatus 56. The reference numeral 58*a* designates an intercooler for cooling the air to be supplied (oxidation agent gas). Reference numeral 59 designates a humidifier for supplying water to the oxidation agent gas. Reference numeral 58*a* designates a bypass valve for supplying the air without going through the intercooler 58*a* and humidifier 59 when the fuel cell 51 is placed under a lower temperature condition. Reference numeral 58*c* designates a back pressure valve for adjusting the pressure of the oxidation agent gas in the fuel cell 51, respectively.

When the purge valve 55 provided in the hydrogen circulation route 54 opens, the hydrogen gas is guided, after the reaction, to the dilution apparatus 56 for mixture with the exhaust air from the fuel cell 51 and diluting process, and thereafter is released to the atmosphere via a silencer 61. Water generated by the fuel cell 51 is collected when it is guided to the humidifier 59 together with the exhaust gas. The water is re-used as the water to be supplied to the oxidation agent gas. Moreover, the water not collected by the humidifier 59 (for example, vapor) is then exhausted together with the reacted gas through the dilution apparatus 56.

Operations of the fuel cell 51 is controlled with an ECU (Electronic Control Unit) 62. In particular, the ECU 62 receives input of a signal regarding the pressure and temperature of the hydrogen gas and the oxidation agent gas, a signal regarding the running velocity of the vehicle and the number of revolutions of the supercharger, and a signal regarding the fuel cell 51 and a temperature of the cooling water thereof. Oerations of the supercharger 58, bypass valve 58*b*, back pressure valve 58*c*, purge valve 55 and shielding valve 53 or the like are thereby controlled in accordance with these signals.

Moreover, the ECU 62 also receives input of an acceleration request signal from a throttle grip 15. The motor 31 for driving the rear wheel 32 is then controlled in accordance with this signal. The motor 31 is formed as a three-phase AC motor which is driven with a three-phase AC current which has been converted, in the motor driver (controller) 64 as an inverter unit, from a DC current supplied from the fuel cell 51 or the battery 63 as the secondary cell.

A cooling system in the fuel cell system is provided with a cooling water route 66 for communicating each water route in the water jacket of the fuel cell 51. In addition, the motor 31, the intercooler 58*a*, and the cooling plate (cooler) are provided adjacent to the motor driver 64. A water pump 67 and a radiator 68 are provided in the cooling water route.

In such cooling system, the cooling water is distributed and circulated within the cooling water route 66 with operations of the water pump 67. Accordingly, the generated heat is absorbed with the fuel cell 51, motor 31, oxidation agent gas, and motor driver 64 and this heat is radiated from the radiator 68. The reference numeral 69 denotes a thermostat for circulating the cooling water without going through the radiator 68 when the fuel cell 51 is in the low temperature condition.

Referring to FIGS. 1–3, the hydrogen cylinder 52 is formed as an ordinary high-pressure bombe having a cylindrical external appearance. This bombe is designed as an ordinary composite vessel formed of metal and fiber reinforced plastic and is arranged at the right side of the rear part of the vehicle body with the axial line C extended along the front and rear direction. In more detail, the bombe is arranged so that the axial line C is a little lowered at the front side. In this case, the hydrogen cylinder 52 is arranged in the manner that the right side end (external end) is located a little in the external side of the external end of the upper tube 5 at the right side of the vehicle body and the left side end (internal end) is located a little in the external side of the external end of the rear wheel 32.

The front and rear end portions of the hydrogen cylinder 52 are formed spherically (in other words, narrowed as it goes to the front end part) and the front end part thereof is arranged so that the front end part is located at the front side of the pivot plate 8, while the rear end part is located at the rear end side of the vehicle body. A main connector 71 and a hydrogen supply port 72 are arranged at the rear end part of the hydrogen cylinder 52.

The upper tube 6 in the left side of the vehicle body extends almost linearly to the rear side with an inclination so that the rear part is a little higher. Meanwhile, the upper tube 6 in the right side of the vehicle body is provided to gradually change toward the lower side at the area near the pivot plate 8 for the upper tube 6 in the left side of the body. The upper tube 6 is changes gradually in the external side of the vehicle width direction at the area near the pivot plate 8.

Moreover, the upper tube 6 in the right side of the body is provided, at its lower end, to almost overlap on the lower end part of the hydrogen cylinder 52, when it is viewed from the side surface of the body. The upper tube is then bent upward at the rear end part of the body and then extends toward the left side of the body avoiding the main connector 71 and hydrogen supply port 72 of the hydrogen cylinder 52. Thereafter, the upper tube 6 is bent to the lower side and is coupled with the rear end part of the upper unit 6 in the left side of the body.

The fuel cell 51 is formed wide in the width direction of the body and flat in the vertical direction of the body. A supply port and an exhaust port of the oxidation agent gas and hydrogen gas and an inlet port and an outlet port of the cooling water are respectively provided at the front wall part. The humidifier 59 including a longer case in the width direction is allocated closely at the upper rear side of the fuel cell 51. At the diagonally upper rear side of the left side of the humidifier 59, the supercharger 58 is allocated closely. The left side part of an inlet duct 57*b* that extends in the width direction is connected at the diagonally lower area side of the supercharger 58. The back pressure valve 58*c* is allocated closely at the upper part of the left side part of the humidifier 59.

The right side part of the inlet duct 57*b* is provided to locate in the lower side of the hydrogen cylinder 52 and is then connected to the front end part of the air-cleaner case 57*a* located at the lower side of the hydrogen cylinder 52. An intake duct (not illustrated) is connected at the rear end part of the air-cleaner case 57*a*. The intake duct, air-cleaner case 57*a*, inlet duct 57*b* form the air cleaner 57.

The bypass valve 58*b* is allocated closely at the rear part of the right side of the humidifier 59. The inter-cooler 58*a* is allocated closely at the diagonally lower rear part of the bypass valve 58*b*. The bypass valve 58*b* and inter-cooler 58*a* are allocated, in the front and rear side of the vehicle body, to locate between the right side part of the humidifier 59 and the right side part of the inlet duct 57*b*. The down-flow side of the supercharger 58 is connected to the inter-cooler 58*a* via the outlet duct (not illustrated).

In the left side of the rear part of the body, the silencer 61 which is flat in the width direction is arranged to locate in the external side in the width direction than the upper tube 6 in the left side of the body. The silencer 61 is formed almost in a square shape when it is viewed from the side surface of the vehicle body and is arranged in an inclined condition with the rear part extended upward at the diagonally upper left side of the rear wheel 32. The silencer 61 is provided at the rear half part of an exhaust pipe 77 inclined with the rear part extended upward. At the rear end part of this silencer 61 (exhaust pipe 77), a tail pipe 75 is provided projected toward the rear side and at the rear end part of the tail pipe 75, and exhaust port 76 of the reacted gas is formed.

The radiator 68 is divided into a comparatively small upper stage radiator 68a located in front of the head pipe 5 and a comparatively large lower stage radiator 68b located in front of the front side part 7 of each down tube 7. The water pump 67 is arranged at the right rear side of the lower stage radiator 68b. The thermostat 69 is arranged at the diagonally lower rear side of the water pump 67. In addition, the battery 63 which is flat in the width direction is respectively arranged at the internal side of the vehicle body cover 42 located in both sides of the lower stage radiator 68b.

The dilution apparatus 56 projects more than the lower end of the lower side part 7b between the bending portions 7c of the down tube 7. An exhaust short pipe 78 is guided out from the dilution apparatus 56. This exhaust short pipe 78 is connected to the front side of the lower side part 7b of the down tube 7 in the left side of the vehicle body and the exhaust pipe 77 is guided out from the rear side of the lower side part 7b. Namely, the down tube 7 in the left side of the vehicle body forms a part of the exhaust path of the reacted gas. Accordingly, the exhaust gas from the dilution apparatus 56 is released to the atmosphere via the exhaust short pipe 78, lower side part of the down tube 7, and exhaust pipe 77.

Figure 5:
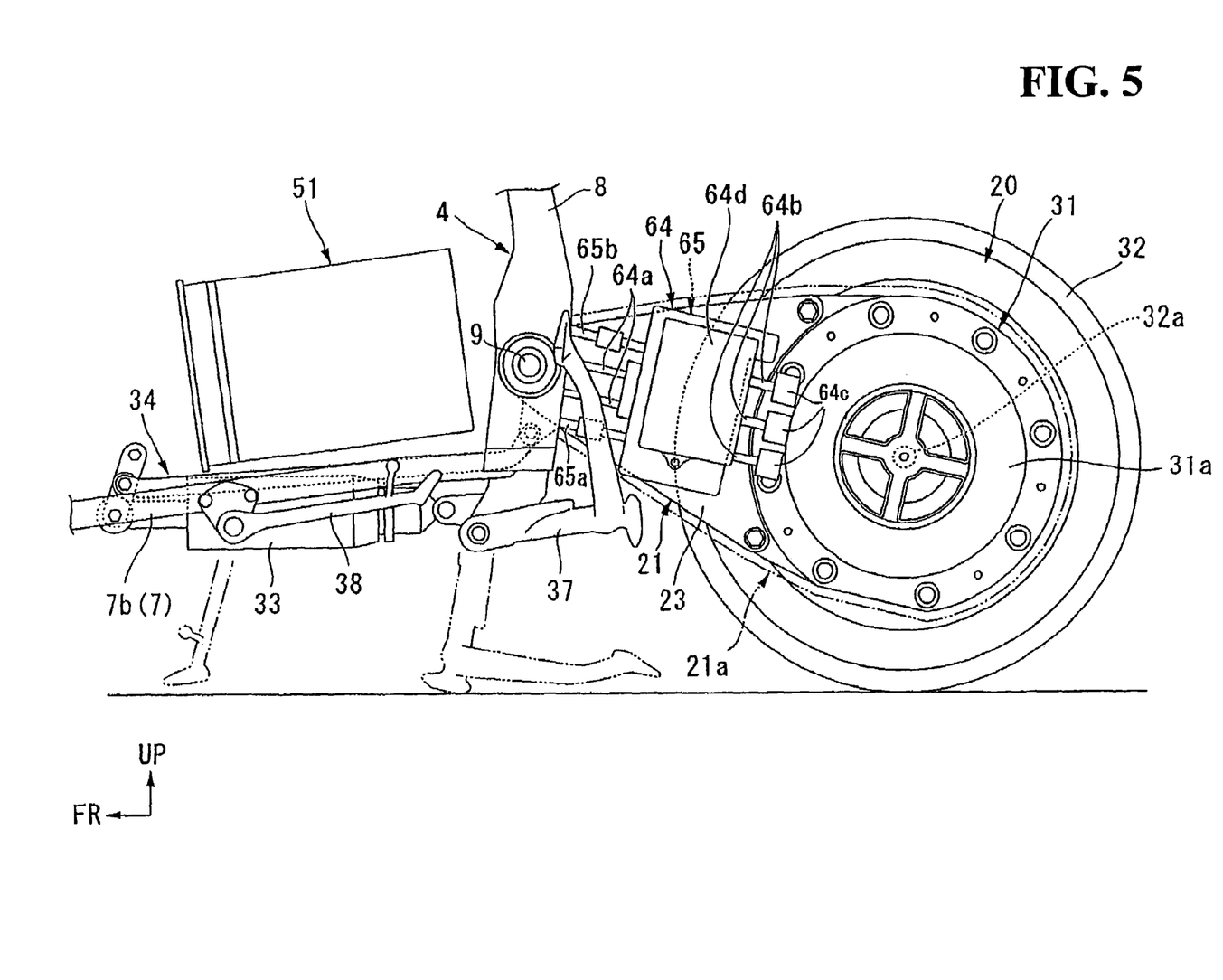
FIG. 5 is an enlarged view of the essential portion of FIG. 1.

Referring to FIG. 5, the motor driver 64 is formed almost in a square shape when it is viewed from the side surface of the vehicle body and is mounted, via the cooling plate 65, in the external side of the width direction of vehicle body of a left arm body 23 of a rear swing arm 21. A high-voltage wire 64a for supplying the electric power from the fuel cell 51 and battery 63 is connected at the front end part of the motor driver 64. A water supply pipe 65a and exhaust pipe 65b forming a part of the cooling water path 66 are respectively connected at the front end lower part and upper part of the cooling plate 65.

A three-phase high-voltage wire 64b is guided from the rear end part of the motor driver 64 and the high-voltage wire 64b of each phase is then connected to a feed terminal at the front end part of the motor 31 located immediately after the motor driver 64. Namely, the motor driver 64 is locted closely to the motor 31 to such a degree that an overlapping condition when it is viewed from the side surface of the vehicle body does not result. The reference numeral 64c designates a current sensor 64c for detecting the amount of power supplied to the motor 31 provided for high-voltage wire 64b of each phase, while reference numeral 64d denotes a voltage smoothing capacitor as a part of the motor driver 64.

An arm cover 21a as a part of the rear swing arm 21 is mounted to the motor unit 20. This arm cover 21a covers, together with the rear swing arm 21 and motor 31, the motor driver 64, cooling plate 65, voltage smoothing capacitor 64d, high-voltage wires 64a, 64b, water supply pipe 56a, exhaust pipe 65b, and current sensor 64c or the like in order to protect these elements. The arm cover 21a is provided respectively with an external air inlet port and outlet port (not illustrated) for circulating the external air at the inside thereof.

Figure 6:
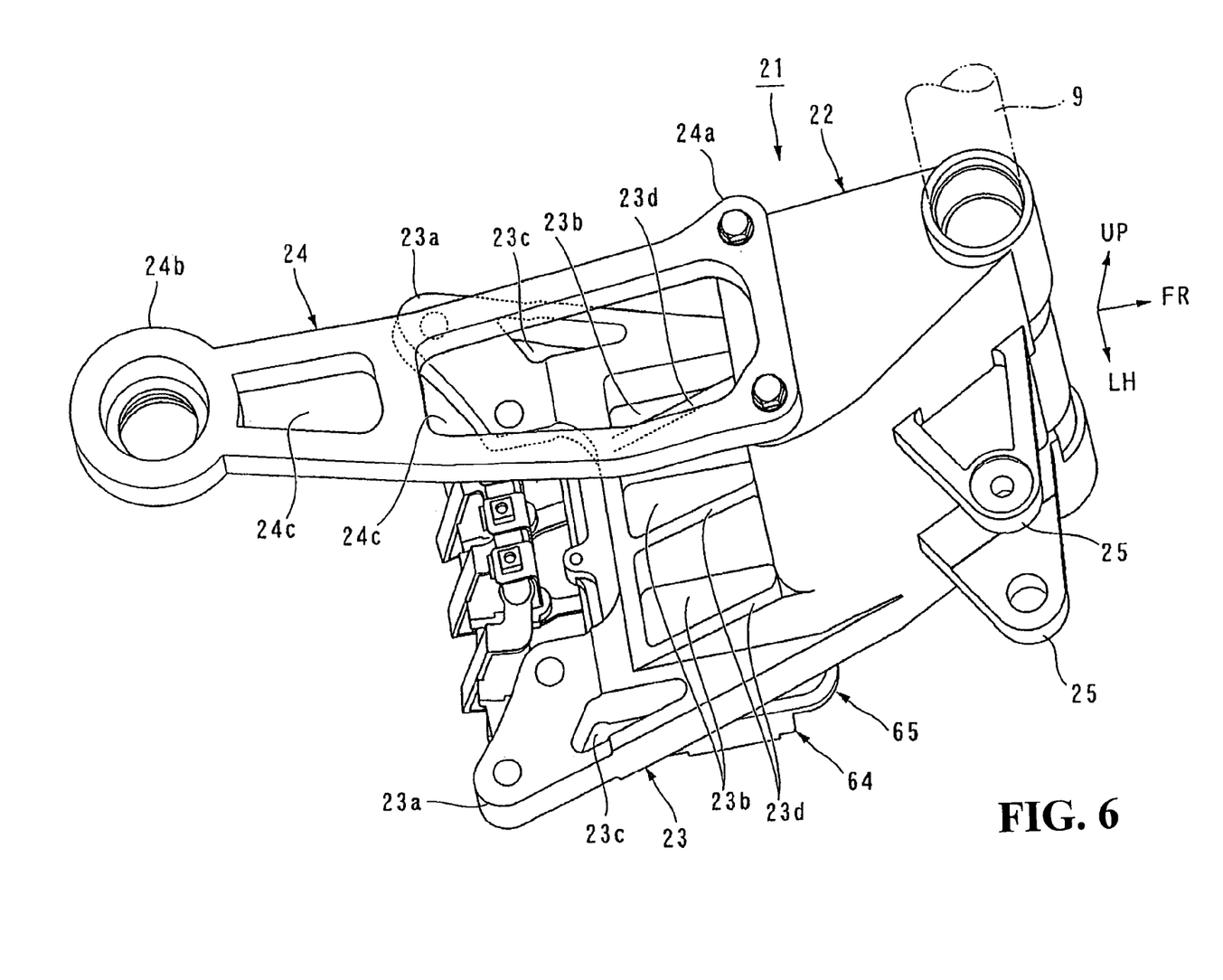
FIG. 6 is a perspective view of the rear swing arm of the electric vehicle viewed from the diagonally right lower side.

As illustrated in FIG. 6, the rear swing arm 21 is formed almost like a triangular prism in which the base part 22 is provided along the width direction of vehicle body. A pivot axis 9 is provided in the rear swing arm 21, along the width direction, through the top part located in the front end side of the base part 22. Simultaneously, the rear swing arm 21 is supported by the pivot plate 8 via the pivot axis 9. The base part of the rear swing arm 21 is formed of an aluminum alloy and a left arm body 23 is integrated at the left side thereof. The left arm body 23 widens as it goes to the rear side for the continuation with the base part 22 when it is viewed from the side surface of the vehicle body.

The left arm body 23 is provided almost along the side surface of vehicle body. The rear end upper part and lower part thereof are coupled 23a with the front end upper part and lower part of the casing 31a of the motor 31. The coupling portion 23a and casing 31a are integrally coupled using a bolt. Almost at the center of the left arm body 23, a center thinning hole 23b of the three stages in the vertical direction is provided almost in a square shape when it is viewed from the side surface of vehicle body. A rear thinning hole 23c is provided almost at the position located in the rear side of the coupling portion 23a. The rear thinning hole 23c is provided almost in a triangular shape when it is viewed from the side surface of the vehicle body. A plurality of triangular ribs 23d that extend to the left arm body 23 and base part 22 are erected at the rear surface side (internal side in the width direction of the vehicle body) of the left arm body 23.

On the other hand, in the right side of the base part 22 of the rear swing arm 21, the front end part of a right arm body 24a formed individually is integrally coupled using a bolt or the like. The right arm body 24 is also formed of aluminum alloy and is provided in opposition to the left arm body 23. The right arm body 24 narrows as it extends to the rear side from the right side of the base part 22. At the rear end part thereof, a supporting part 24b of the rear wheel 32a is provided. Moreover, the right arm body 24 is formed as the member almost in the shape of 日 (in other words in the shape of a bar having two generally rectangular apertures formed therethrough) when it is viewed from the side surface of the vehicle body because a large size thinning hole 24c is formed in the front and rear portions.

Figure 7:
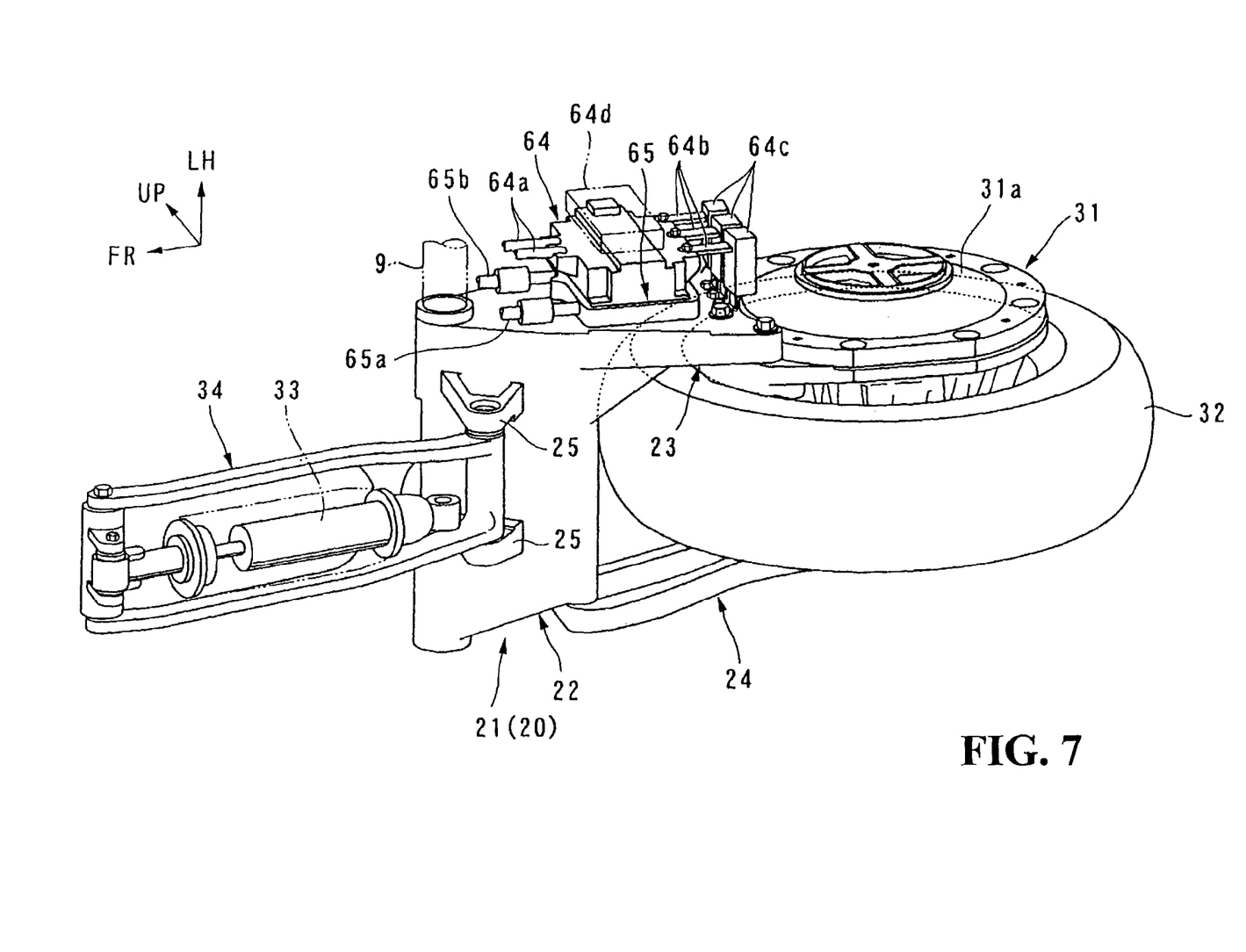
FIG. 7 is a perspective view of the peripheral part of the motor unit of the electric vehicle viewed from the diagonally left lower side.

Referring to FIG. 7, at the external side surface of the left arm body 23 of the rear swing arm 21, the cooling plate 6 almost in a square shape when it is viewed from the side surface of vehicle body is mounted to close the center thinning hole 23b. The cooling plate 65 is arranged, in its internal side surface, adjacently to the external side surface of the left arm body 23 through contact therewith. The almost rectangular-parallelepipedic cooling plate 65 and the motor driver 64 are mounted at the external side of the cooling plate 65. The almost rectangular-parallelepipedic cooling plate 65 is flat in the width direction of vehicle body and the motor driver 64 almost overlaps with the cooling plate when it is viewed from the side surface of vehicle body.

The motor driver 64 is arranged, in its internal surface, adjacently to the external surface of the cooling plate 65 through contact therewith. Therefore, cooling by this cooling plate becomes possible. Moreover, the voltage smoothing capacitor 64d is arranged, in its internal surface, adjacently to the external surface of the driver body 64c through contact therewith and is also provided, in its external surface, facing to the external surface of the vehicle body. The reference numeral 25 denotes lower mount for coupling of one end side of a link mechanism 34.

As described above, the controller cooling structure of the electronic vehicle (motorcycle 1) of the embodiment described above is provided with the motor 31 for supplying the power to the rear wheel 32 as the drive wheel, the motor driver 64 for controlling drive of the motor 31, and the cooling plate 65 for circulating the cooling water into the motor driver 64 for cooling the same. One surface of the cooling plate 65 is arranged adjacent to the motor driver 64, while the other surface thereof is arranged adjacent to the rear swing arm 21.

According to this structure, heat generated from the motor driver 64 including, for example, a power FET or the like is effectively absorbed by the water cooling type cooling plate 65 and heat absorbed by the body of the cooling plate 65 is effectively propagated to the rear swing arm 21 formed of aluminum alloy. Accordingly, the cooling effect of the motor driver 64 can further be improved.

Moreover, in the controller cooling structure described above, the motor unit 20 which accommodates the motor 31 and is supported to swing for the vehicle body frame 4 together with the rear swing arm 21 is provided and the cooling plate 65 and motor driver 64 are mounted to the motor unit 20. Accordingly, a length of the connecting wire between the motor 21 and motor driver 64 becomes short and thereby an amount of heat generated by the motor driver 64 can also be suppressed. Therefore, the wire connecting the motor 21 and motor driver 64 can also be simplified and a relative cooling effect can also be improved by suppressing an amount of heat generated by the motor driver 64. In addition, an electrical influence of the motor 31 and motor driver 64 can further be reduced.

Moreover, in the controller cooling structure described above, the motor driver 64 is arranged adjacent to the motor 21 and is also arranged not to wrap the motor 21 when it is viewed from the side surface of vehicle body. Therefore, a length of wire connecting the motor 21 and motor driver 64 can further be shortened. In addition, the cooling effect of the motor driver 64 can further be improved by minimizing the influence on the motor driver 64 of the heat generated from the motor.

Furthermore, in the controller cooling structure described above, the water supply pipe 65a connected to the cooling plate 65 and water discharge pipe 65b are arranged adjacent to the rear swing arm 21. Therefore, the water supply pipe 65a and water discharge pipe 65b never project to the external side from the motor unit 20. Accordingly, the piping for cooling water in the periphery of the motor unit 20 can be simplified and thereby maintenance of the cooling system can be improved.

The present invention is not limited to the embodiment described above. For example, it is also possible that the center thinning hole 23b at the left arm body 23 of the rear swing arm 21 is eliminated and the left arm body 23 is formed as the flat plate and the cooling plate 65 is arranged adjacent (in contact) to this flat plate. According to this structure, heat generated from the motor driver 64 is effective propagated to the rear swing arm 21 via the cooling plate 65. Therefore, the cooling effect of the motor driver 64 can be improved.

The structure of the embodiment described above is only an example and this structure is not limited to a motorcycle and a fuel cell electric vehicle, but naturally allows various changes or modifications within the scope of the subject matter of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A controller cooling structure in an electric vehicle, comprising:
    a motor, said motor supplying drive power to a drive wheel of the electric vehicle;
    a controller, said controller controlling the drive of the motor; and
    a cooling plate, said cooling plate distributing cooling water to an interior thereof to cool the controller,
    wherein one surface of the cooling plate is provided adjacent to the controller and another surface of the cooling plate is provided adjacent to a vehicle body member,
    wherein the cooling plate is mounted on the vehicle body member and the controller is mounted on the cooling plate so that the cooling plate is located between the controller and the vehicle body member.

2. The controller cooling structure in an electric vehicle according to claim 1, further comprising a motor unit, said motor unit accommodating the motor and being supported to freely swing on a body frame of the electric vehicle together with the vehicle body member,
    wherein the cooling plate and the controller are mounted in the motor unit.

3. The controller cooling structure in an electric vehicle according to claim 1, wherein the controller is arranged in proximity to the motor and is arranged not to overlap the motor when the motor is viewed from a side surface of the body frame.

4. The controller cooling structure in an electric vehicle according to claim 2, wherein the controller is arranged in proximity to the motor and in a position approximately midway between a pivot axis point of the vehicle body member and a center point of the drive wheel.

5. The controller cooling structure in an electric vehicle according to claim 1, wherein a portion of the vehicle body member to which the cooling plate is adjacently provided is formed as a flat plate.

6. The controller cooling structure in an electric vehicle according to claim 1, further comprising a cover for covering the controller, the cooling plate, and the motor.

7. The controller cooling structure in an electric vehicle according to claim 1, wherein a water supply pipe and a water discharge pipe are coupled with a front end part of the cooling plate and are arranged adjacent to the vehicle body member.

8. The controller cooling structure in an electric vehicle according to claim 1, wherein a water supply pipe and a water discharge pipe forming a part of a cooling water path are respectively connected at a front end lower part and a front end upper part of the cooling plate.

9. The controller cooling structure in an electric vehicle according to claim 1, wherein said vehicle body member is a rear swing arm of the electric vehicle, and
    said motor, said controller and said cooling plate are mounted to swing with said rear swing arm on a body frame of the electric vehicle.

10. The controller cooling structure in an electric vehicle according to claim 1, wherein the controller includes a voltage smoothing capacitor facing an external surface of the vehicle body member, and said motor is mounted generally co-axial with said drive wheel.

11. The controller cooling structure in an electric vehicle according to claim 1, wherein the cooling plate is formed to have a shape that is an almost rectangular-shaped parallelepiped.

12. An electric vehicle, comprising:
a body frame;
a drive wheel mounted to the body frame;
a motor, said motor supplying drive power to the drive wheel;
a controller, said controller controlling the drive of the motor; and
a cooling plate, said cooling plate distributing cooling water to an interior thereof to cool the controller,
wherein one surface of the cooling plate is provided adjacent to the controller and another surface of the cooling plate is provided adjacent to a vehicle body member,
wherein the cooling plate is mounted on the vehicle body member and the controller is mounted on the cooling plate so that the cooling plate is located between the controller and the vehicle body member.

13. The electric vehicle according to claim 12, further comprising a motor unit, said motor unit accommodating the motor and being supported to freely swing on the body frame of the electric vehicle together with the vehicle body member,
wherein the cooling plate and the controller are mounted in the motor unit,
wherein the cooling plate is formed to have a shape that is an almost a rectangular-shaped parallelepiped.

14. The an electric vehicle according to claim 12, wherein the controller is arranged in proximity to the motor and is arranged not to overlap the motor when the motor is viewed from a side surface of the body frame.

15. The electric vehicle according to claim 12, wherein a portion of the vehicle body member to which the cooling plate is adjacently provided is formed as a flat plate.

16. The electric vehicle according to claim 12, wherein a the water supply pipe and the water discharge pipe are coupled with the cooling plate and are arranged adjacent to the vehicle body member.

17. The electric vehicle according to claim 12, wherein said vehicle body member is a rear swing arm of the electric vehicle, and said motor, said controller and said cooling plate are mounted to swing with said rear swing arm on a body frame of the electric vehicle.

18. The electric vehicle according to claim 12, wherein said motor is mounted generally co-axial with said drive wheel.

19. The an electric vehicle according to claim 12, further comprising a water supply pipe and a water discharge pipe coupled to a front end part of the cooling plate.

20. A controller cooling structure for an electric vehicle, the electric vehicle comprising a motor, the motor supplying drive power to a drive wheel of the electric vehicle, and a controller, the controller controlling the drive of the motor, said controller cooling structure comprising:
a cooling plate, said cooling plate distributing cooling water to an interior thereof to cool the controller,
wherein said cooling plate is mounted to a vehicle body member and said controller is mounted to the cooling plate so that said cooling plate is located between the controller and the vehicle body member.

21. The controller cooling structure in an electric vehicle according to claim 20, further comprising a motor unit, said motor unit accommodating the motor and being supported to freely swing on a body frame of the electric vehicle together with the vehicle body member,
wherein the cooling plate and the controller are mounted in the motor unit.

22. The controller cooling structure in an electric vehicle according to claim 20, wherein the controller is arranged in proximity to the motor and is arranged to partially overlap a forward part of the drive wheel when the drive wheel is viewed from a side surface of the body frame.

23. The controller cooling structure in an electric vehicle according to claim 20, further comprising a water supply pipe and a water discharge pipe forming a part of a cooling water path are respectively connected at a front end lower part and a front end upper part of the cooling plate.

* * * * *